United States Patent

[11] 3,569,962

[72] Inventor Robert W. Kuthe
West Covina, Calif.
[21] Appl. No. 650,909
[22] Filed July 3, 1967
[45] Patented Mar. 9, 1971
[73] Assignee Hoffman Electronics Corporation
El Monte, Calif.

[54] IDENTIFICATION TONE GENERATOR
6 Claims, 1 Drawing Fig.

[52] U.S. Cl. .......... 340/384, 340/328
[51] Int. Cl. .......... G08b 3/00
[50] Field of Search .......... 340/384, 328, 213; 331/65; 328/138, 139; 333/75 (Inquired)

[56] References Cited
UNITED STATES PATENTS

| | | | |
|---|---|---|---|
| 3,100,889 | 8/1963 | Cannon .......... | 340/213X |
| 3,187,202 | 6/1965 | Case .......... | 328/138X |
| 3,284,796 | 11/1966 | Borsattino et al. .......... | 340/384E |
| 3,312,107 | 4/1967 | Burns et al. .......... | 331/65X |
| 3,389,349 | 6/1968 | Troost et al. .......... | 333/75X |

*Primary Examiner*—Donald J. Yusko
*Assistant Examiner*—Michael Slobasky
*Attorney*—Lyon and Lyon

ABSTRACT: In a TACAN system a peak detector senses the filtered output of a one-shot multivibrator and energizes an audio oscillator whose output is fed to the audio system of an aircraft.

PATENTED MAR 9 1971
3,569,962
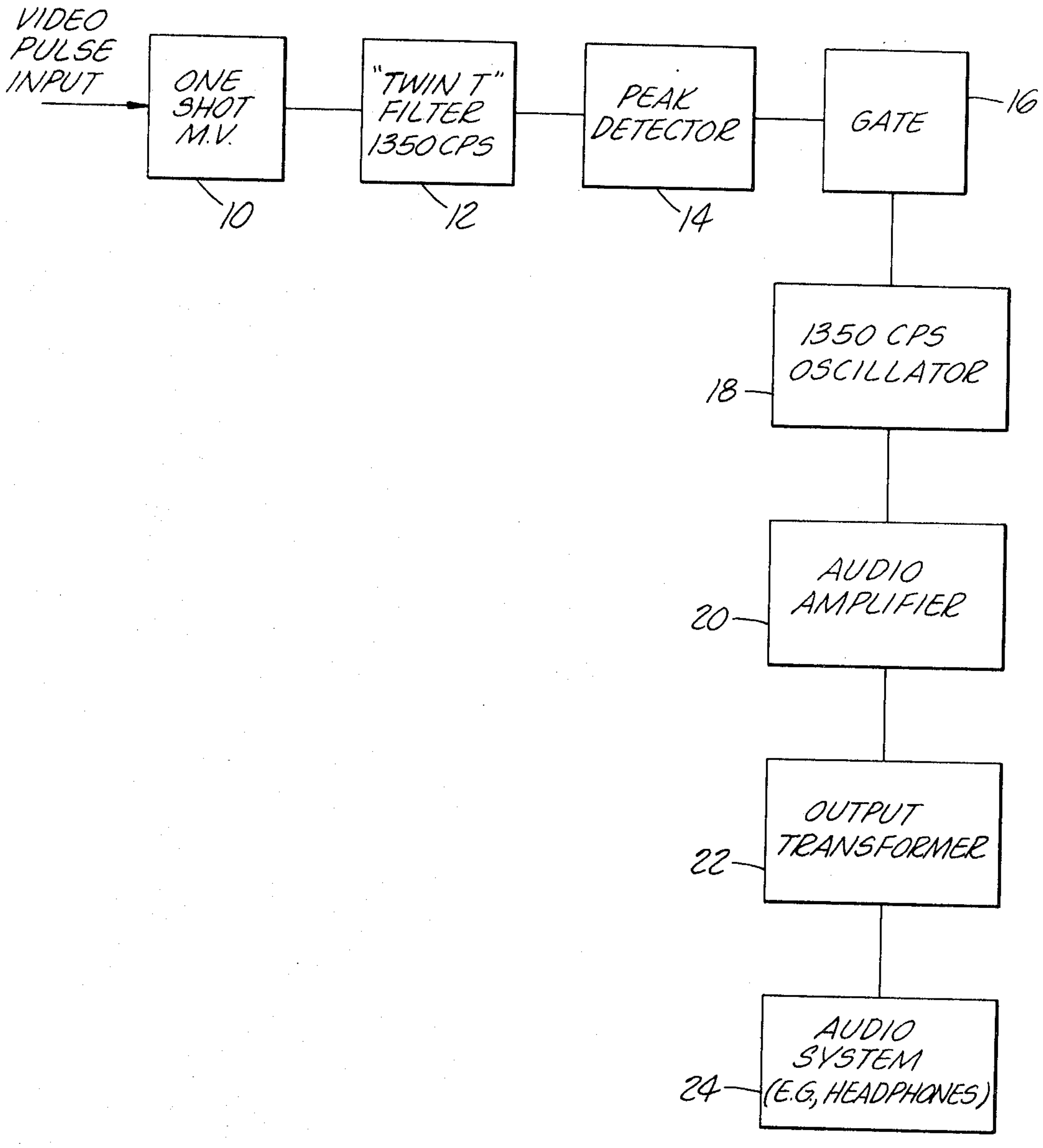
ROBERT W. KUTHE
INVENTOR
BY Lyon & Lyon
ATTORNEYS

IDENTIFICATION TONE GENERATOR

BACKGROUND OF THE INVENTION

In a TACAN system, the position of an aircraft is determined by computing the distance and bearing of the aircraft with respect to a ground beacon. In order that each ground beacon can be individually identified, each beacon periodically transmits a series of dots and dashes that are coded to identify it. These dots and dashes are made up of a series of a narrow pulses having a repetition rate of 1350 cycles per second and lasting for different durations to signify dots and dashes, namely, one-eighth of a second for a dot and three-eighths of a second for a dash. In prior TACAN systems, the incoming pulses were applied to a 1350 cycle filter the output of which would build up to a predetermined magnitude as long as the pulses were received. The output of the filter was then amplified and fed to the audio system of the aircraft, typically the pilot's headset. While this system accomplishes the desired result, any noise variations introduced into the receiver circuitry were also built up by the filter and amplified causing an unpleasant audio signal to be introduced into the audio tone the pilot must listen to. Moreover, because the average value of the output of the filter might vary as the result of noise or the like, the magnitude of the tone heard by the pilot also varied.

SUMMARY OF THE INVENTION

According to the present invention, a gated oscillator is used to generate a clean tone to the headset of the audio system of the receiving vehicle in a TACAN system regardless of input noise or the like. The oscillator is turned on when a peak detector indicates that the filtered output of the one-shot multivibrator has reached a suitable level. As a result of using the gated oscillator, a constant amplitude audio output is insured.

BRIEF DESCRIPTION OF THE DRAWINGS

The sole FIGURE is a block diagram of the present invention.

DESCRIPTION OF THE INVENTION

As shown in the single FIGURE, the input signal is fed to a one-shot multivibrator 10 which is triggered by each pulse thereof and develops a square wave in which each pulse has a duration of one-half of the spacing between said input pulses. The square wave output of the one-shot multivibrator 10 is fed to a 1350 cycle per second filter 12, preferably of twin "T" type, which causes the square wave to be filtered and produces an output whose magnitude is representative of the magnitude of the 1350 cycle component of the square wave.

The output of the filter 12 is fed to a peak detector 14 which produces an output signal to energize a gate 16 while the output of the filter 12 exceeds a desired level. When the gate 16 is actuated, it, for example, couples a power supply (not shown) to a 1350 cycle per second oscillator 18, causing the latter to be energized. The output of the oscillator 18 is amplified by an audio amplifier 20 and passed through an output transformer 22 to the audio system of the aircraft, for example, the pilot's headphones. When the magnitude of the 1350 cycle component of the square wave drops below a desired level causing the filter output to decrease below the threshold set by the peak detector 14, the gate 16 is deenergized and the oscillator 18 shut off.

As a result of the system of the present invention, the pilot receives a constant amplitude audio signal from which the effects of noise have been eliminated. As a result, the signal is less offensive and less likely to irritate the pilot or otherwise detract from his abilities to carry out his other duties.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a TACAN system, a circuit for producing in the audio system of a receiving vehicle an audio signal indicative of the identity of a ground beacon producing a series of coded pulses at a given frequency comprising: means for producing a square wave output in response to said pulses; means for producing an output indicative of the magnitude of the component in said square wave of said frequency; means for detecting when the magnitude of said frequency component exceeds a predetermined level and producing an output signal in response thereto; an audio oscillator; means coupled to said audio oscillator and responsive to said output signal from said detector means to energize said audio oscillator; and means for coupling the output of said audio oscillator to said audio system.

2. The circuit of claim 1 wherein said square wave producing means comprises a one-shot multivibrator and wherein said means for indicating the magnitude of said frequency component comprises a filter.

3. The circuit of claim 2 wherein means are provided for amplifying the output of said audio oscillator.

4. The circuit of claim 3 wherein said means coupling said oscillator with said detecting means comprises a gate means.

5. The circuit of claim 2 wherein said multivibrator produces a pulse of said square wave in response to each input of said pulses, each of said square wave pulses having a duration of one-half the spacing between said input pulses.

6. The circuit of claim 5 wherein said filter is tuned to pass said given frequency.